United States Patent
Smilgevich et al.

(10) Patent No.: US 11,131,823 B2
(45) Date of Patent: Sep. 28, 2021

(54) GROUND WIRE WITH OPTICAL FIBERS

(71) Applicant: Incab, LLC, Perm (RU)

(72) Inventors: Alexander Smilgevich, Perm (RU); Alexey Shabalin, Perm (RU); Sergey Yakovlev, Perm (RU); Michael L Riddle, Rome, GA (US)

(*) Notice: Subject to any disclaimer, the term of this patent is extended or adjusted under 35 U.S.C. 154(b) by 0 days.

(21) Appl. No.: 16/181,682

(22) Filed: Nov. 6, 2018

(65) Prior Publication Data

US 2019/0146174 A1 May 16, 2019

(30) Foreign Application Priority Data

Nov. 14, 2017 (RU) .......................... RU2017141031

(51) Int. Cl.
*G02B 6/44* (2006.01)
*H02G 7/22* (2006.01)

(52) U.S. Cl.
CPC ............. *G02B 6/4494* (2013.01); *H02G 7/22* (2013.01)

(58) Field of Classification Search
CPC ................................ G02B 6/4494; H02G 7/22
USPC .................................................. 385/100, 101
See application file for complete search history.

(56) References Cited

U.S. PATENT DOCUMENTS

| | | | | |
|---|---|---|---|---|
| 3,670,045 A * | 6/1972 | Koleske | ............... | C08G 63/664 525/533 |
| 5,230,033 A * | 7/1993 | Soodak | ............... | G02B 6/4402 174/108 |
| 5,377,290 A * | 12/1994 | Ohta | ................ | G02B 6/4407 385/100 |
| 5,495,546 A * | 2/1996 | Bottoms, Jr. | ........ | G02B 6/4407 385/101 |
| 5,787,217 A * | 7/1998 | Traut | .................... | G02B 6/4411 385/100 |
| 6,012,495 A * | 1/2000 | Antonsen | ................ | C23F 13/16 138/131 |
| 6,195,488 B1 * | 2/2001 | Song | .................... | G02B 6/4416 385/101 |
| 6,236,789 B1 * | 5/2001 | Fitz | ...................... | G02B 6/4416 385/100 |
| 6,788,858 B1 * | 9/2004 | Park | ...................... | G02B 6/441 385/106 |

(Continued)

FOREIGN PATENT DOCUMENTS

CN  201160014   12/2007
CN  200208872 U * 10/2011

(Continued)

OTHER PUBLICATIONS

Dai et al., Machine Translation of CN200208872U published Oct. 12, 2011, obtained from ip.com. (Year: 2011).*

*Primary Examiner* — Michelle R Connelly
(74) *Attorney, Agent, or Firm* — Law Office of Ilya Libenzon

(57) ABSTRACT

A ground wire with optical fibers is disclosed. The ground wire includes twisted optical modules in the form of plastic tubes that accommodate freely placed optical fibers and water-blocking gel, wherein water-blocking tape applied to twisted optical modules, which are enclosed in a steel tube, coated with an aluminum sheath. The aluminum sheath is helically wrapped with lays of wire. The technical result is provided by increased air tightness of the optical core and permissible crushing stresses.

8 Claims, 1 Drawing Sheet

(56) References Cited

U.S. PATENT DOCUMENTS

| | | | | |
|---|---|---|---|---|
| 7,382,955 | B1 * | 6/2008 | Keller | G02B 6/441 |
| | | | | 385/100 |
| 9,581,777 | B2 * | 2/2017 | Baucom | G02B 6/4403 |
| 2002/0027012 | A1 * | 3/2002 | Bonicel | H01B 7/22 |
| | | | | 174/102 R |
| 2007/0019915 | A1 * | 1/2007 | Overton | G02B 6/4494 |
| | | | | 385/100 |
| 2010/0166375 | A1 * | 7/2010 | Parris | G02B 6/4494 |
| | | | | 385/113 |
| 2011/0176782 | A1 * | 7/2011 | Parris | G02B 6/4494 |
| | | | | 385/113 |
| 2015/0268429 | A1 * | 9/2015 | Baucom | G02B 6/4403 |
| | | | | 385/114 |
| 2017/0082813 | A1 * | 3/2017 | Cignarale | G02B 6/441 |

FOREIGN PATENT DOCUMENTS

| | | | | |
|---|---|---|---|---|
| CN | 2058303021 | U | * | 6/2016 |
| CN | 106935319 | A | * | 7/2017 |
| RU | 2114471 | C1 | * | 6/1998 |
| RU | 2114474 | C1 | | 6/1998 |
| RU | 15046 | U1 | | 10/2005 |
| RU | 149964 | U1 | | 1/2015 |

* cited by examiner

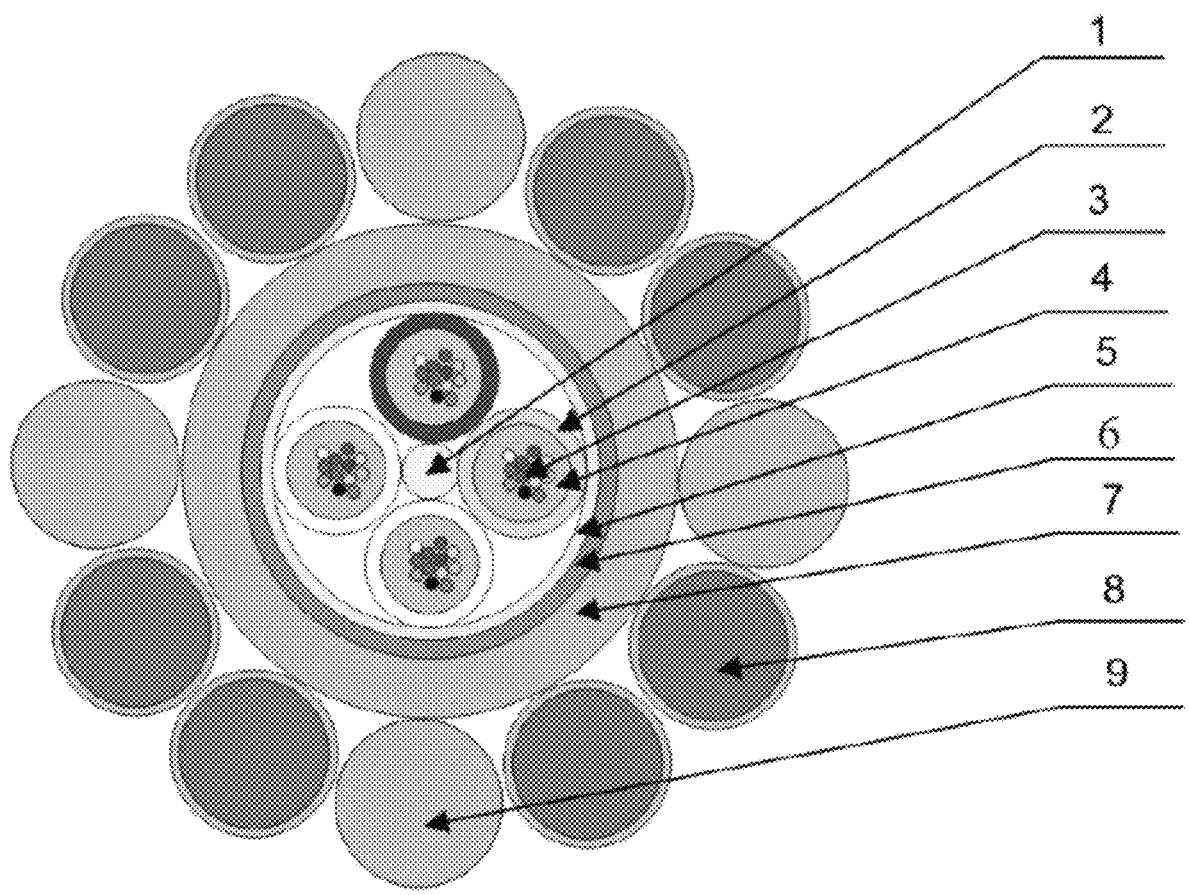

GROUND WIRE WITH OPTICAL FIBERS

CROSS-REFERENCE TO RELATED APPLICATIONS

This application claims priority to Russian patent application No. 2017141031, filed Nov. 14, 2017, the disclosure of which is incorporated herein by reference in its entirety.

FIELD OF THE INVENTION

This invention relates generally to ground wire cables, and more specifically to ground wire cables with optical fibers.

BACKGROUND OF THE INVENTION

The ground wire performs two functions as follows: 1) the traditional ground wire function, i.e. protection of power transmission lines (PTL) against lighting strokes, and current leakage grounding in the case of a short circuit. The ground wire is a mandatory element in a backbone power transmission line. It is used as a ground conductor running along an overhead power transmission line to protect current-carrying conductors against direct lightning strokes. The ground wire is suspended above current-carrying conductors and grounded at each tower; and 2) the communication cable/data transmission function via optical fiber. Being an optical cable, OPGW should protect optical fibers located therein against mechanical damage and should not deteriorate transmission characteristics, such as attenuation, polarization mode dispersion, etc. The wire is a widely used solution for construction of fiber-optic communication lines on the supports of an overhead power transmission line (FOCL-OL); the wire facilitates construction of fiber-optic communication lines (FOCL) in hard-to-reach places and passages. A natural step in the development of FOCL was combining optical fiber with ground wire: in the modern world, 80% of PTLs carry not just steel wires on their supports, but optical ground wires. The core of the latter is a traditional optical cable enclosed into a steel sheath. The OL infrastructure is used for construction of FOCL all over the world. The overhead laying of a fiber-optic cable is also the most technically simple and the least resource-demanding method of arrangement of outdoor fiber-optic cable (FOC) backbones. FOCL-OLs are arranged by means of suspending special optical cables on the supports of PTL of various voltages, on the supports of city lighting/electric transport networks. The fact that the signals transmitted via optical fiber are not exposed to detrimental effects from electromagnetic fields of PTLs has made it possible to create such communication lines.

The core design of the first generation of ground wires with optical fibers is similar to that of regular underground optical cables: it contains one or several polymer modules with optical fiber (OF) and, in certain cases, a central member (CM) made of fiberglass. All those elements are enclosed in an aluminum tube that protects the core against ingress of moisture and enhances conductivity. The first-generation ground wires are lightweight and can accommodate a large number of optical fibers, however, they have a serious disadvantage—the aluminum tube cannot ensure the sufficient air tightness and strength under crushing forces.

In the second-generation ground wires, the crushing strength problem is solved by using a slotted aluminum core that also provides a higher conductivity for short-circuit (SC) currents. The core is wrapped with aluminum tape for the purpose of air tightness. Such design, however, makes the cable much heavier and limits the number of fibers.

The third-generation ground wires have a central tube (top) and a lay of tubes and wires (bottom). The main element of their design is a thin central tube made of stainless steel that accommodates OF. The same technologies as for the production of needles for medical syringes are used for the production of this tube. Such a tube can play a role of CM and have a high crushing strength. It prevents the ingress of moisture and aggressive substances due to air tightness thereof. The main disadvantage of the above designs is the presence of a corrosion couple between the steel optical module and aluminum. Although the steel optical module is made of a high-grade stainless steel, it corrodes over time. The design with the steel module in the center, within the aluminum sheath, solves this problem, but further limits the maximum number of optical fibers in the cable to 96.

The most similar analog of the present utility model is the ground wire with optical fibers known from RU 2114474. The disadvantage of said analog is that it uses only the aluminum tube for protection of the twisted core against external environment effects. The aluminum tube cannot ensure the sufficient air tightness and strength under crushing forces.

SUMMARY OF THE EMBODIMENTS

In one aspect, a ground wire with optical fibers includes twisted optical modules in the form of plastic tubes that accommodate freely placed optical fibers and water-blocking gel; water-blocking tape applied to twisted optical modules which are enclosed in a steel tube coated with an aluminum sheath. The aluminum sheath is helically wrapped with lays of wire. The technical result is provided by increased air tightness of the optical core and permissible crushing stresses.

Other aspects, embodiments and features of the fiber optic overhead ground wire cable will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed system and method, will be better understood when read in conjunction with the attached drawings. It should be understood, however, that neither the device nor the method is limited to the precise arrangements and instrumentalities shown.

FIG. 1 is a cross-sectional schematic illustration of the ground wire in accordance with an embodiment of the present invention.

DETAILED DESCRIPTION OF SPECIFIC EMBODIMENTS

The utility model is intended to suspend and arrange fiber-optic communication lines on the supports of overhead power transmission lines with a voltage of 35 kV and higher.

The objective of the present utility model is to provide a ground wire design ensuring enhanced air tightness of the optical core and increased permissible crushing stresses. The objective is achieved by the fact that the ground wire with optical fibers comprises twisted optical modules in the form of plastic tubes that accommodate freely placed optical fibers and water-blocking gel; water-blocking tape applied to twisted optical modules which are enclosed in a steel tube coated with an aluminum sheath, wherein said aluminum sheath is helically wrapped with lays of wire.

The combination of the above essential features provides the technical result, i.e. the enhancement of optical core air tightness and permissible crushing stresses.

The wire may comprise up to 288 optical fibers.

The steel tube can be made in the form of a stainless steel tube.

The aluminum sheath can be made in the form of an aluminum sheath made of electrical aluminum of grade ASE.

The aluminum sheath can be solid-drawn.

A lay may comprise aluminum clad steel wires, aluminum alloy wires, or a combination thereof.

FIG. 1 schematically illustrates a cross-section of the ground wire in accordance with an embodiment of the present invention.

The disclosed utility model combines all the advantages of the three generations of the ground wire, while lacking the disadvantages inherent in each individual generation.

Referring to FIG. 1 in more detail, the center of the optical cable integrated into the ground wire comprises an optical core comprising twisted optical modules 2 and, in certain cases, rod 1 that is located in the center of the twisted of modules. Optical modules are polymer tubes comprising optical fibers 3. The free space inside the modules is filled with a hydrophobic gel 4. To prevent longitudinal ingress of water, a water-blocking, e.g. polyether, tape 5 is applied longitudinally on the core. The twisted optical core is enclosed in a steel tube 6, for example, in a welded tube made of stainless steel, which ensures air tightness of the optical core and high permissible crushing stresses. The steel tube is tightly coated with aluminum sheath 7, for example, a solid-drawn sheath, which ensures high corrosion resistance of the cable and significantly increases conductivity thereof. Electrical aluminum of grade A5E is used as the raw material for the aluminum sheath. The aluminum sheath is helically wrapped with lays of reinforcing wires. A lay may comprise aluminum clad steel wires 8, aluminum alloy wires 9, or a combination thereof. Due to the modular design of the core, the wire may contain up to 288 optical fibers. The use of plastic optical modules, as compared to steel optical modules, significantly simplifies the installation technique and reduces the risk of installation errors.

It will be understood that the device and method may be embodied in other specific forms without departing from the spirit or central characteristics thereof. The present examples and embodiments, therefore, are to be considered in all respects as illustrative and not restrictive, and the device and method is not to be limited to the details given herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A ground wire with optical fibers comprising:
    twisted optical modules in the form of plastic tubes that contain inside freely placed optical fibers and water-blocking gel; and
    a water-blocking tape applied to the outside of said twisted optical modules which are enclosed in a steel tube coated with an aluminum sheath, wherein said aluminum sheath is helically wrapped with lays of wire.

2. A ground wire according to claim 1, wherein the number of said optical fibers does not exceed 288.

3. A ground wire according to claim 1, wherein the steel tube is made of stainless steel.

4. A ground wire according to claim 1, wherein the aluminum sheath is made of A5E grade electrical aluminum.

5. A ground wire according to claim 1, wherein the aluminum sheath is solid-drawn.

6. A ground wire according to claim 1, wherein the lays of wire comprise wires made of aluminum-clad steel, aluminum alloy wires, or a combination thereof.

7. A ground wire according to claim 1, further comprising a rod located in the center of the twisted optical modules.

8. A ground wire according to claim 1, wherein the water blocking tape is made of polyether.

* * * * *